(12) United States Patent
Kikuchi et al.

(10) Patent No.: US 9,594,508 B2
(45) Date of Patent: Mar. 14, 2017

(54) COMPUTER SYSTEM HAVING TIERED BLOCK STORAGE DEVICE, STORAGE CONTROLLER, FILE ARRANGEMENT METHOD AND STORAGE MEDIUM

(71) Applicants: KABUSHIKI KAISHA TOSHIBA, Minato-ku, Tokyo (JP); TOSHIBA SOLUTIONS CORPORATION, Kawasaki-shi, Kanagawa (JP)

(72) Inventors: Toshihiro Kikuchi, Tokyo (JP); Naoki Iketani, Tokyo (JP)

(73) Assignees: Kabushiki Kaisha Toshiba, Tokyo (JP); Toshiba Solutions Corporation, Kanagawa (JP)

( * ) Notice: Subject to any disclaimer, the term of this patent is extended or adjusted under 35 U.S.C. 154(b) by 0 days.

(21) Appl. No.: 14/482,311

(22) PCT Filed: Mar. 4, 2014

(86) PCT No.: PCT/JP2014/055424
§ 371 (c)(1),
(2) Date: Sep. 10, 2014

(87) PCT Pub. No.: WO2015/132873
PCT Pub. Date: Sep. 11, 2015

(65) Prior Publication Data
US 2016/0371001 A1 Dec. 22, 2016

(51) Int. Cl.
G06F 3/06 (2006.01)
G06F 17/30 (2006.01)
G06F 12/06 (2006.01)

(52) U.S. Cl.
CPC ............ *G06F 3/0604* (2013.01); *G06F 3/064* (2013.01); *G06F 3/0634* (2013.01);
(Continued)

(58) Field of Classification Search
CPC ...... G06F 3/0604; G06F 3/0634; G06F 3/064; G06F 3/0643; G06F 3/0659; G06F 3/0683;
(Continued)

(56) References Cited

U.S. PATENT DOCUMENTS 9,092,461 B1 * 7/2015 Suldhal ............. G06F 17/30286
2009/0254719 A1 10/2009 Sasage
(Continued)

FOREIGN PATENT DOCUMENTS

JP 2004-295457 10/2004
JP 2004-310621 11/2004
(Continued)

OTHER PUBLICATIONS

English Translation of the International Preliminary Report on Patentability issued on Sep. 6, 2016, in counterpart International Application No. PCT/JP2014/055424 (6 pages).
(Continued)

*Primary Examiner* — Ryan Bertram
(74) *Attorney, Agent, or Firm* — Finnegan, Henderson, Farabrow, Garrett & Dunner LLP

(57) ABSTRACT

According to one embodiment, a storage controller includes a mode switching unit, a data input/output controller and a data arrangement controller. The mode switching unit switches a first mode to a second mode in accordance with a mode switching request from a host device based on a tier arrangement rule. The data input/output controller accesses a first sequence of blocks constituting a first file indicated by a tier arrangement rule, when the host device requests access to a logical address range storing the first sequence of blocks. The data arrangement controller transfers, to a storage area of a tier designated by the tier arrangement rule, data in an extent including a sequence of blocks located in a logical address range accessed in the second mode.

15 Claims, 9 Drawing Sheets

(52) U.S. Cl.
CPC .......... G06F 3/0643 (2013.01); G06F 3/0659 (2013.01); G06F 3/0683 (2013.01); G06F 12/0692 (2013.01); G06F 17/30082 (2013.01); G06F 17/30091 (2013.01); *G06F 2212/1008* (2013.01); *G06F 2212/222* (2013.01); *G06F 2212/657* (2013.01)

(58) Field of Classification Search
CPC .......... G06F 12/0692; G06F 17/30082; G06F 17/30091; G06F 2212/1008; G06F 2212/222; G06F 2212/657
See application file for complete search history.

(56) References Cited

U.S. PATENT DOCUMENTS

| | | | |
|---|---|---|---|
| 2011/0231596 A1* | 9/2011 | Goss | G06F 12/0246 711/103 |
| 2012/0110259 A1 | 5/2012 | Mills et al. | |
| 2012/0278569 A1* | 11/2012 | Kawakami | G06F 3/0608 711/162 |
| 2013/0111171 A1* | 5/2013 | Hirezaki | G06F 3/0605 711/165 |
| 2013/0290598 A1* | 10/2013 | Fiske | G06F 3/0625 711/103 |

FOREIGN PATENT DOCUMENTS

| | | |
|---|---|---|
| JP | 2005-108239 | 4/2005 |
| JP | 2007-305012 | 11/2007 |
| JP | 2009-251751 | 10/2009 |
| JP | 2010-257094 | 11/2010 |
| JP | 2014-500542 | 1/2014 |

OTHER PUBLICATIONS

First Office Action issued by the Japanese Patent Office on Mar. 10, 2015, for Japanese Patent Application No. 2014-534841, and English-language translation thereof.

* cited by examiner

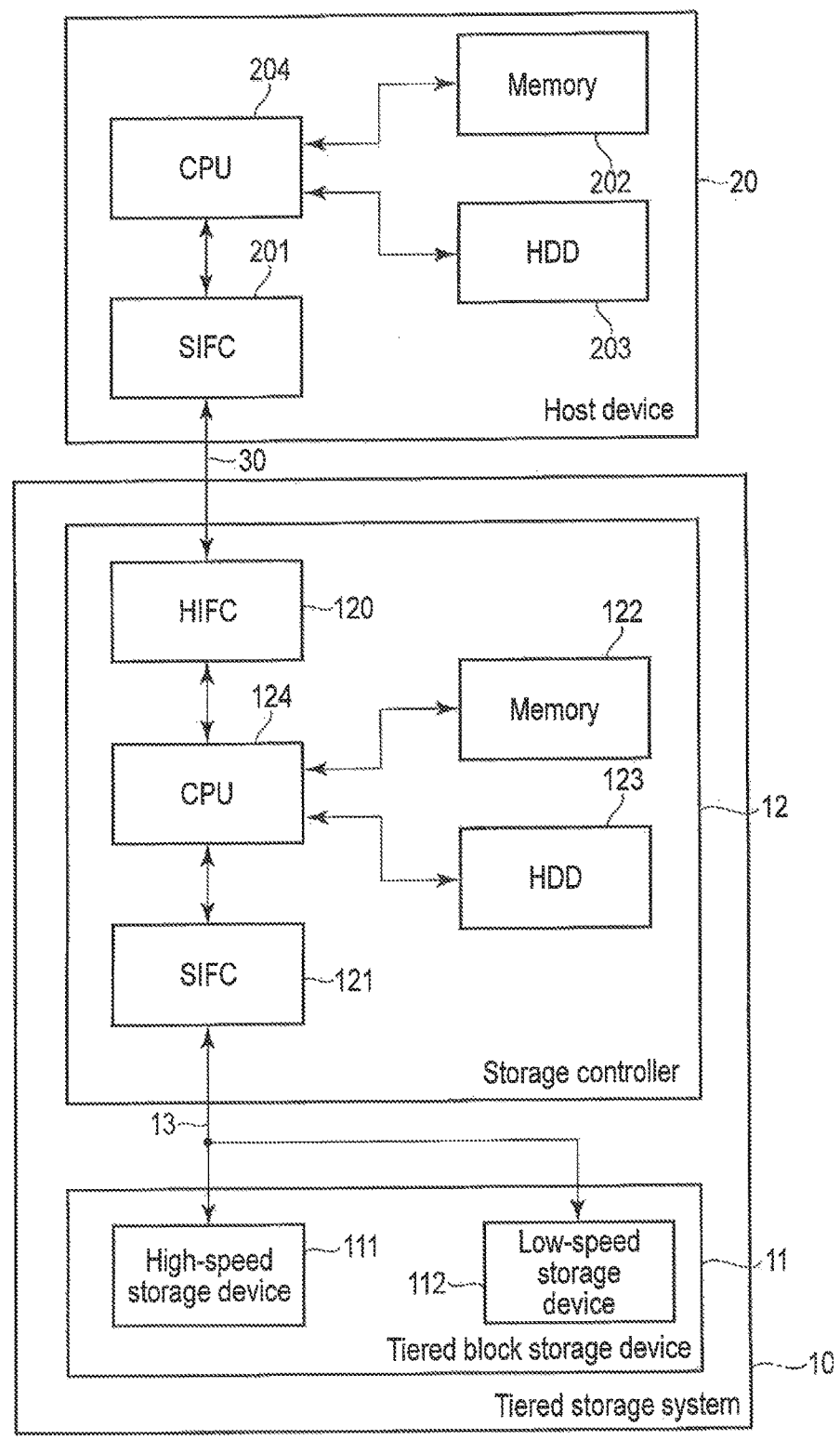
F I G. 1

Extent management table 128

| Extent ID | LBA | Physical storage ID | Physical storage address | Tier transfer flag |
|---|---|---|---|---|
| 0 | 00000-08191 | 5 | 30304-38495 | Off |
| 1 | 08192-16383 | 10 | 66121-74312 | Off |
| ⋮ | ⋮ | ⋮ | ⋮ | ⋮ |

FIG. 3

File/logical-address management table 252

| File path | LBA |
|---|---|
| /var/log/message.log | 000-015 |
| /opt/db/file.db | 016-100,240-501 |
| /tmp/tmp.txt | 950-978 |
| ⋮ | ⋮ |

FIG. 4

Tier arrangement rule list 27

| Rule ID | Tier | Rule type | Rule content | Start time | Finish time |
|---|---|---|---|---|---|
| 1 | Upper | File designation | / var / log / *.log<br>/ etc / db / *.db | 0:00 | 3:00 |
| 2 | Lower | File designation | / etc / *.conf | 3:00 | 5:00 |
| 3 | Upper | Application cooperation | / etc / webserver /flash.bat | 22:00 | 0:00 |
| ⋮ | ⋮ | ⋮ | ⋮ | ⋮ | ⋮ |

FIG. 5

File path list 28

| File path ID | File path |
|---|---|
| 1 | / var / log / message.log |
| 2 | / var / log / secure.log |
| ⋮ | ⋮ |

FIG. 6

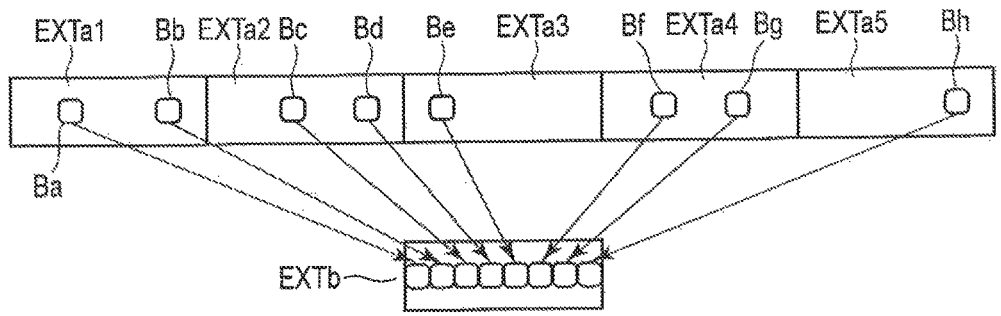
F I G. 10
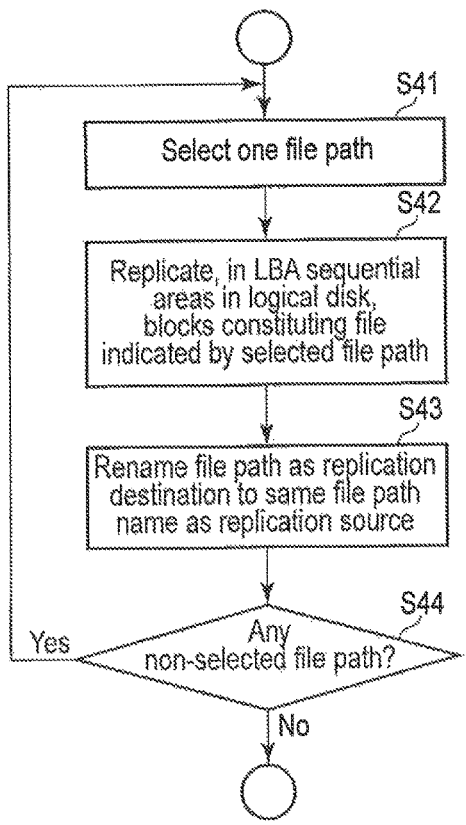
F I G. 11

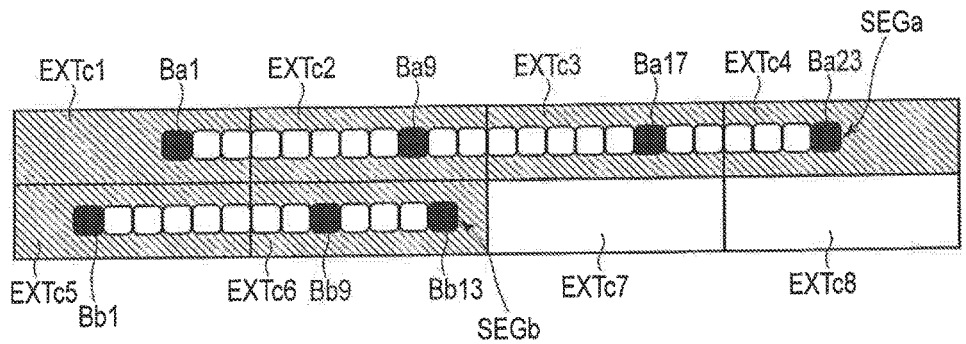
F I G. 12
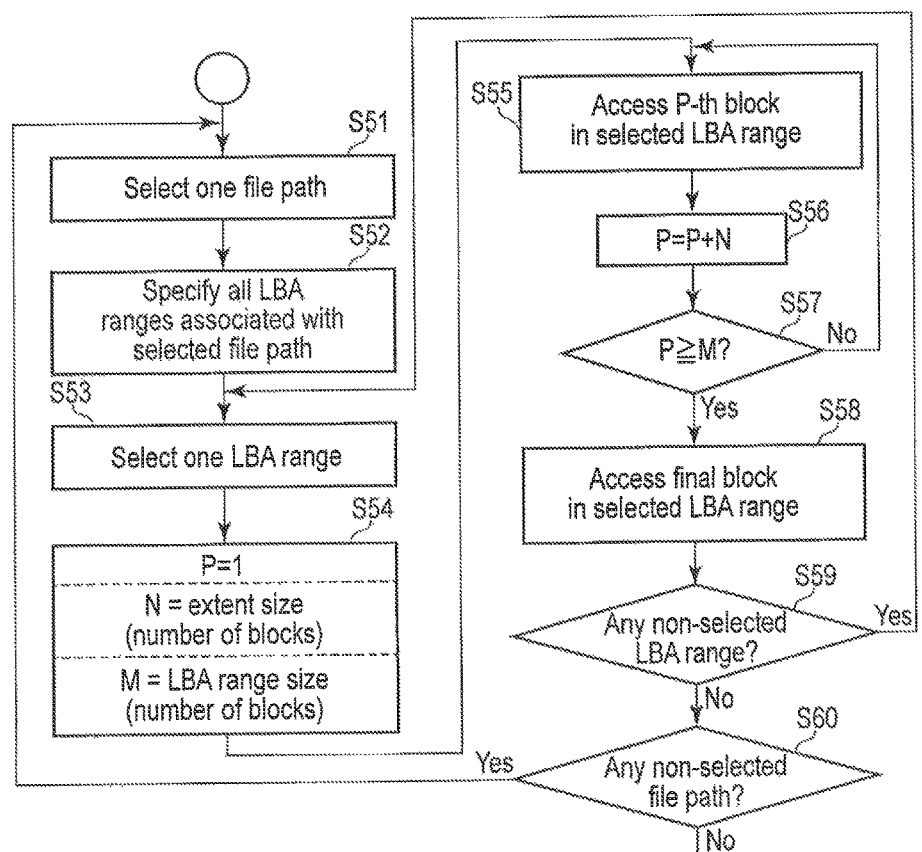
F I G. 13

COMPUTER SYSTEM HAVING TIERED BLOCK STORAGE DEVICE, STORAGE CONTROLLER, FILE ARRANGEMENT METHOD AND STORAGE MEDIUM

CROSS REFERENCE TO RELATED APPLICATIONS

This application is a Continuation Application of PCT Application No. PCT/JP2014/055424, filed Mar. 4, 2014, the entire contents of which are incorporated herein by reference.

FIELD

Embodiments described herein relate generally to a computer system with a tiered block storage device, a storage controller, a file arrangement method and a storage medium.

BACKGROUND

Various storage devices utilizing a storage tiering technique, so-called tiered block storage devices, have recently been developed. The storage tiering technique ties together the physical storage areas (hereinafter, referred to as physical volumes) of various types of storage devices of different access response performances. As a result, the storage tiering technique constructs at least one virtual storage area (hereinafter, referred to as a logical volume) including a plurality of physical volumes as entities. The logical volume is also called a logical disk and can be recognized by a host device (computer).

In the storage tiering technique, a set of storage devices (physical volumes) of the same type is called "a tier." In general, storage devices of higher access response performances are allocated (positioned) to a higher-tier. Namely, the tiered block storage device is provided with various types of storage devices of different tiers, and the logical disk is formed using the physical volumes of the storage devices of different tiers.

In a computer system having the tiered block storage device, it is requested to locate a designated file in a designated tier. In general, the tiered block storage device cannot recognize a file. In view of this, in the prior art, a special file system (file system program) is provided in the tiered block storage device. This special file system associates a file used by the host device with positions on the logical disk of blocks constituting the designated file. As a result, the tiered block storage device (more specifically, the storage controller of the tiered block storage device) can specify blocks that constitute the designated file and can locate them in the designated tier.

As mentioned above, in the prior art, a function of locating a designated file in a designated tier is realized by a special file system provided in the tiered block storage device. Namely, the conventional tiered block storage device requires the special file system.

BRIEF DESCRIPTION OF THE DRAWINGS

FIG. 1 is a block diagram showing an exemplary hardware configuration of a computer system according to an embodiment;
FIG. 3 is a view showing a data structure example of an extent management table in the embodiment;
FIG. 4 is a view showing a data structure example of a file/logical-address management table in the embodiment;
FIG. 5 is a view showing a data structure example of a tier arrangement rule list;
FIG. 6 is a view showing a data structure example of a file path list in the embodiment;
FIG. 10 is a view for explaining the outline of a file arrangement processing according to a first modification of the embodiment;
FIG. 11 is a flowchart for explaining an exemplary procedure of the file arrangement processing executed on the host device side in the first modification;
FIG. 12 is a view for explaining the outline of a partial read processing according to a second modification of the embodiment;
and
FIG. 13 is a flowchart for explaining an exemplary procedure of the partial read processing executed on the host device side in the second modification.

DETAILED DESCRIPTION

Figure 2:
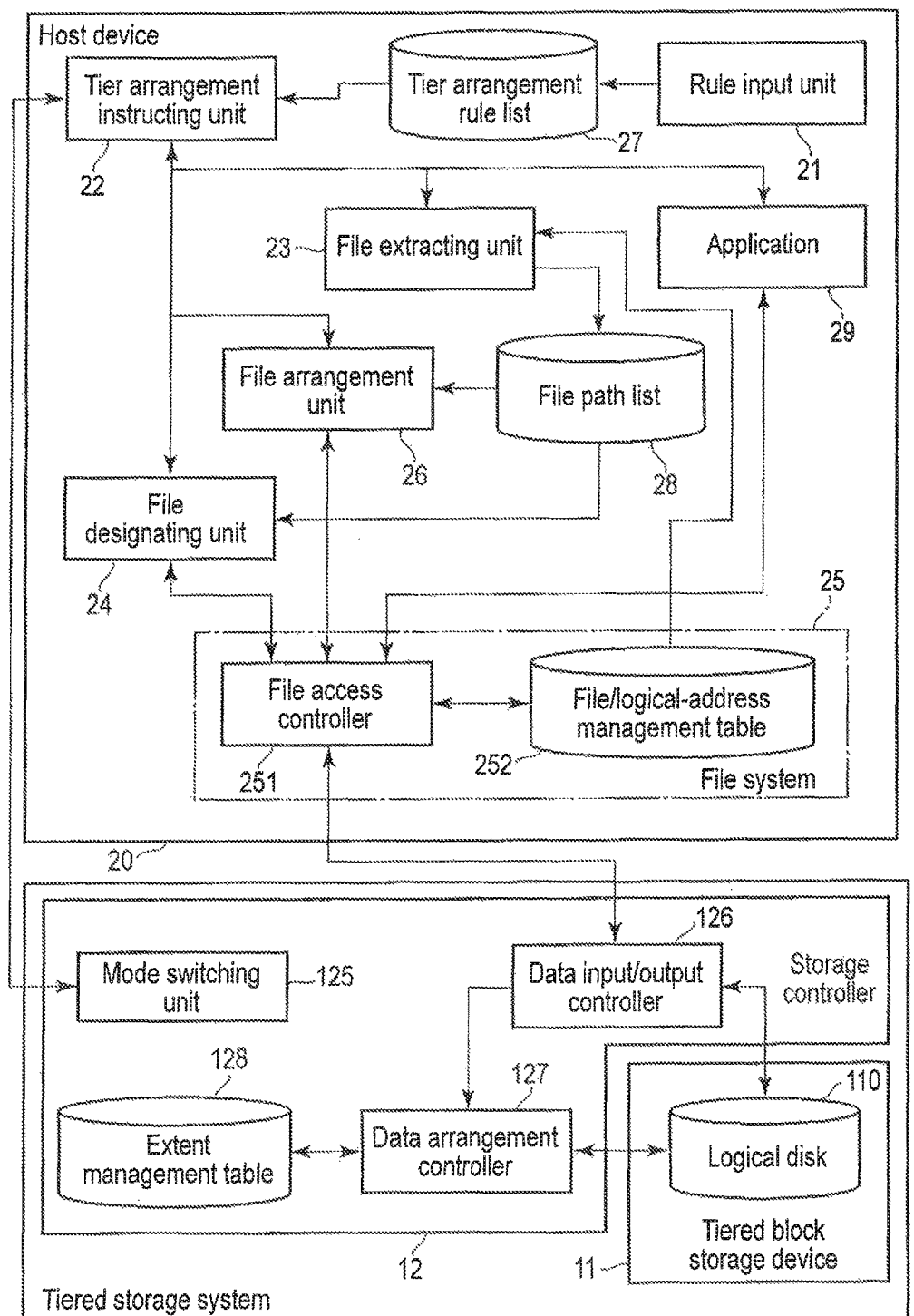
FIG. 2 is a block diagram mainly showing an exemplary functional configuration of the tiered storage system and host device shown in FIG. 1.

Various embodiments will be described hereinafter with reference to the accompanying drawings.

In general, according to one embodiment, a computer system comprises a tiered block storage system and a host device. The host device is configured to access the tiered block storage system. The tiered block storage system comprises a tiered block storage device and a storage controller. The tiered block storage device comprises plural types of storage devices of different access response performances. The storage devices are allocated to respective tiers corresponding to the access response performances of the storage devices. At least a part of each storage area of at least two of the storage devices is allocated to a logical disk comprising a plurality of blocks of a first size. The logical disk is used to store files used by the host device. The storage controller comprises a mode switching unit, a data input/output controller and a data arrangement controller. The host device comprises a file system, a rule input unit, a tier arrangement instructing unit and a file designating unit. The mode switching unit is configured to switch an operation mode of the tiered block storage system from a first mode to a second mode in accordance with a request from the host device. The data input/output controller is configured to access the logical disk in accordance with an access request from the host device. The file system is configured to manage, for respective files stored in the logical disk, correspondence between file paths indicative of the respective files and logical address ranges storing the respective files. The file system is further configured to access, via the data input/output controller, a sequence of blocks constituting a file and stored in one of the logical address ranges when the file designating unit requests the file system to access the one logical address range. The rule input unit is configured to receive, in accordance with an external request, a tier arrangement rule including file path information used to designate a file, and tier information used to designate a tier in which the file is to be located. The tier arrangement instructing unit is configured to instruct the storage controller to switch the operation mode to the second mode based on the tier arrangement rule. The file instructing unit is configured to instruct the file system to access a logical address range which stores a first sequence of blocks constituting a first file indicated by the file path information of the tier arrangement rule. The data arrangement controller is configured to transfer, to a storage area of a tier designated by the tier arrangement rule, data in an extent including a sequence of blocks located in a logical address range accessed in the second mode. The extent is formed of a second number of blocks having sequential logical addresses.

FIG. 1 is a block diagram showing an exemplary hardware configuration of a computer system according to an embodiment. The computer system comprises a tiered storage system 10 and a host device 20. The tiered storage system 10 (more specifically, a storage controller 12 incorporated in the storage system 10) is connected to the host device 20 via a host interface bus 30, such as a fiber channel (FC), a small computer system interface (SCSI), a serial attached SCSI (SAS), Internet SCSI (iSCSI), Ethernet (trademark), or a serial AT attachment (SATA). The host device 20 uses the tiered storage system 10 as an external storage device. The tiered storage system 10 may be connected to the host device 20 via a network, such as a storage area network (SAN), the Internet or an intranet. Further, the tiered storage system 10 may be connected to a plurality of host devices including the host device 20.

The tiered storage system 10 comprises a tiered block storage device 11 and the storage controller 12. The tiered block storage device 11 comprises a high-speed storage device (a first type of storage device) 111, and a low-speed storage device (a second type of storage device) 112. The high-speed storage device 111 and the low-speed storage device 112 are connected to the storage controller 12 via a storage interface bus 13, such as FC, SCSI, SAS, iSCSI, Ethernet or SATA.

The high-speed storage device 111 comprises a flash storage device, such as a flash array, excellent in access response performance (i.e., having a high access rate). The flash storage device is realized by a plurality of flash memory boards. Each of the flash memory boards includes a set of flash memories. In the embodiment, it is assumed that none of the flash memory boards is compatible with a hard disk drive (HDD). However, a plurality of solid state drives (SSD) compatible with HDDs may be used in place of the flash memory boards.

In contrast, the low-speed storage device 112 comprises a hard disk drive (HDD) array that has a lower access response performance (i.e., a lower access rate) than, for example, the high-speed storage device 111 (flash storage device). The HDD array is a storage device of, for example, a RAID (Redundant Arrays of Inexpensive Disks or Redundant Arrays of Independent Disks) structure that has a plurality of HDDs. The high-speed storage device 111 and the low-speed storage device 112 do not always have to have an array structure.

The high-speed storage device 111 and the low-speed storage device 112 can be accessed using each mass of data of a first size as a minimum access unit. The data of the first size is called a block. Accordingly, the high-speed storage device 111 and the low-speed storage device 112 are called block storage devices.

As described above, in the tiered storage system 10 (tiered block storage system 11) shown in FIG. 1, two (two types of) storage devices having different access response performances (having different access rates) exist. In this case, the high-speed storage device 111 is allocated to an upper tier (high-speed tier=first tier), and the low-speed storage device 112 is allocated to a lower tier (low-speed tier=second tier). The tiered storage system 10 may further comprise a storage device (a storage device of a third tier), such as a magnetic tape device, lower in speed than the low-speed storage device 112.

The storage controller 12 comprises a host interface controller (hereinafter, referred to as HIFC) 120, a storage interface controller (hereinafter, referred to as SIFC) 121, a memory 122, an HDD 123 and a CPU 124.

The HIFC 120 controls data transfer (a data transfer protocol) between the host device 20 and the HIFC 120. The HIFC 120 receives, from the host device 20, a data access request (a read or write request) to access a logical volume, and returns thereto a response to the data access request. Upon receiving a data access request from the host device 20, the HIFC 120 transfers this request to the CPU 124. Upon receiving the data access request, the CPU 124 processes the same.

The SIFC 121 receives an input/output (I/O) request based on the data access request (the write or read request to access the logical volume) received by the CPU 124 from the host device 20. The SIFC 121 accesses the high-speed storage device 111 or the low-speed storage device 112 in response to the received I/O request.

The memory 122 is a rewritable volatile memory such as a DRAM. A part of the memory 122 is used to store a storage control program loaded from the HDD 123. Another part of the memory 122 is used as a work area for the CPU 124.

The HDD 123 stores the storage control program. The CPU 124 executes an initial program loader (IPL) when the storage controller 12 is activated, thereby loading the storage control program from the HDD 123 into the memory 122. The IPL is stored in a nonvolatile memory, such as a read only memory (ROM) or a flash ROM (FROM).

The CPU 124 functions as a mode switching unit 125, a data input/output controller 126 and a data arrangement controller 127, which will be described later, in accordance with the storage control program loaded into the memory 122. Namely, the CPU 124 controls the entire tiered storage system 10 (in particular, each element in the storage controller 12) by executing the storage control program loaded into the memory 122.

The host device 20 comprises an SIFC (interface controller) 201, a memory 202, an HDD 203 and a CPU 204. The SIFC 201 controls data transfer between the storage controller 12 (more specifically, the HIFC 120 of the storage controller 201) of the tiered storage system 10 and the SIFC 201. The SIFC 201 supplies the storage controller 12 with a data access request from the CPU 204, and receives a response to the data access request from the storage controller 12. Upon receiving the response from the storage controller 12, the SIFC 201 transfers the response to the CPU 204.

The memory 202 is a rewritable volatile memory, such as a DRAM, like the memory 122. A part of the memory 202 is used to store an operating system (OS) and various programs loaded from the HDD 203. Another part of the memory 202 is used as a work area for the CPU 204.

The HDD 203 stores the OS and the various programs. The programs include application programs (hereinafter, referred to simply as applications) and utility programs.

When the host device 20 is activated, the CPU 204 executes an IPL stored in a nonvolatile memory, such as a ROM or an FROM, thereby loading the OS from the HDD 203 into the memory 202. The CPU 204 also loads a program from the HDD 203 into the memory 202 when necessary.

In accordance with a particular program (e.g., a particular utility program) and the OS loaded into the memory 202, the CPU 204 functions as a rule input unit 21, a tier arrangement instructing unit 22, a file extracting unit 23, a file designating unit 24, a file system 25 (more specifically, a file access controller 251 incorporated in the file system 25) and a file arrangement unit 26, which will be described later. In this embodiment, the CPU 204 functions as the rule input 21, the tier arrangement instructing unit 22, the file extracting unit 23 and the file arrangement unit 26 in accordance with the particular utility program, and functions as the file designating unit 24 and the file system 25 (the file access controller 251) in accordance with the OS.

FIG. 2 is a block diagram mainly showing an exemplary functional configuration of the tiered storage system 10 and the host device 20 shown in FIG. 1. The tiered block storage device 11 of the tiered storage system 10 comprises a logical disk 110. In the embodiment, for simplifying the description, it is assumed that the tiered block storage device 11 comprises a single logical disk (110). However, the tiered block storage device 11 may comprise a plurality of logical disks.

The logical disk 110 is also called a logical volume, and has a virtual storage area (a so-called logical address space). This virtual storage area is divided for management into a plurality of logical blocks of a first size. Namely, the logical disk 110 comprises a plurality of logical blocks. The logical blocks are designated by respective logical block addresses (LBAs). The virtual storage area is further divided for management into a plurality of logical extents of a second size. The second size is N (N is an integer greater than 1) times the first size. Namely, each logical extent is formed of N logical blocks designated by N sequential LBAs. In the embodiment, N is 8,192. However, N may be a value other than 8,192 and greater than 1. In the description below, the logical block and the logical extent may be referred to simply as a block and an extent, respectively.

At least a part of the storage area (i.e., a physical volume) of the high-speed storage device 111 is allocated (i.e., mapped) to a part of the virtual storage area of the logical disk 110. Further, at least a part of the storage area of the low-speed storage device 112 is allocated to another part of the virtual storage area. Thus, the logical disk 110 has, as entities, a plurality of physical volumes of different tiers (in the embodiment, a physical volume of the upper tier and a physical volume of the lower tier). Namely, the logical disk 110 (more specifically, the entities of the logical disk 110) is formed of a combination of the physical volumes (first and second physical volumes) of the high-speed storage device 111 and the low-speed storage device 112. Each of the first and second physical volumes comprises a plurality of physical blocks of the same size (first size) as the logical block. The logical disk 110 stores files used by, for example, the host device 20. Each file is formed of one or more blocks.

The storage controller 12 of the tiered storage system 10 comprises a mode switching unit 125, a data input/output controller 126 and a data arrangement controller 127. These functional elements 125 to 127 are software modules realized by the CPU 124 of the storage controller 12 shown in FIG. 1 executing the storage control program. However, at least one of the functional elements 125 to 127 may be realized by a hardware module.

The mode switching unit 125 switches the operation mode of the tiered storage system 10. In the embodiment, the storage controller 12 of the tiered storage system 10 is operable at least in a normal mode (first mode) and an area arrangement mode (second mode). The normal mode is an operation mode for executing access, requested by the host device 20, to one or more blocks in the logical disk 110. In the description below, if there is no particular condition, it is assumed for simplification that blocks more than one are accessed. The area arrangement mode is an operation mode for mainly executing subsequent first and second operations, in addition to access to blocks requested by the host device 20. The first operation includes activation of a tier transfer flag associated with an extent including the accessed blocks. The tier transfer flag will be described later. The second operation includes locating, in a storage area of a designated tier, all extents corresponding to tier transfer flags in an ON state, when the host device 20 has designated the end of the area arrangement mode, and then switching the operation mode of the tiered storage system 10 from the area arrangement mode to the normal mode.

The data input/output controller 126 accesses blocks in the logical disk 110 requested by the host device 20. The data arrangement controller 127 operates the above-mentioned tier transfer flags, and locates, in the storage area of the designated tier, all extents corresponding to the activated tier transfer flags.

The storage controller 12 further comprises an extent management table 128. The extent management table 128 is stored in the HDD 123 of the storage controller 12 shown in FIG. 1, and is loaded from the HDD 123 into the memory 122 when necessary (when, for example, the storage controller 12 is activated).

FIG. 3 shows a data structure example of the extent management table 128. The extent management table 128 includes entries associated with the respective extents of the logical disk 110. Each of the entries of the extent management table 128 comprises an extent identifier (ID) field, an LBA field, a physical storage ID field, a physical storage address field and a tier transfer flag field. The tier transfer flag field is used to hold a tier transfer flag indicative of whether a corresponding extent should be transferred to a designated tier.

The extent ID field is used to hold an ID (extent ID) for identifying the corresponding extent. The LBA field is used to hold LBA Information associated with N sequential blocks (logical blocks) constituting the corresponding extent. In the embodiment, the LBA information contains the respective LBAs of the leading and final blocks of the corresponding extent. Namely, the LBA information is indicative of the LBA range of the corresponding extent.

The physical storage ID field is used to hold an ID (physical storage ID) for identifying a storage device (physical storage device) including N physical blocks allocated to N sequential blocks in the corresponding extent. The physical storage address field is used to hold physical storage address information associated with N physical blocks allocated to N sequential logical blocks (i.e., a sequence of N logical blocks) in the corresponding extent.

In the embodiment, N physical blocks are continuous in a corresponding physical storage device. The physical storage address information includes the respective physical storage addresses of the leading and final physical blocks of the N sequential physical blocks. Namely, the physical storage address information is indicative of the physical address range of the corresponding extent.

As described above, each of the entries of the extent management table 128 holds extent information used to management the corresponding extent. The extent information includes the extent ID, LBA information, physical storage ID, physical storage address information and tier transfer flag.

If the tiered block storage device 11 comprises a plurality of logical disks, the same number of extent management tables 128 as the logical disks may be prepared in association with the respective logical disks. Further, if a logical disk ID field is added to each of the entries of the extent management table 128, the extant management table 128 can be shared among the plurality of logical disks. This structure is also applicable to, for example, a file/logical-address management table 252 described later.

As shown in FIG. 2, the host device 20 comprises the rule input unit 21, the tier arrangement instructing unit 22, the file extracting unit 23, the file designating unit 24, the file system 25 and the file arrangement unit 26. The file system 25 includes the file access controller 251. As aforementioned, the functional elements 21 to 26 (more specifically, the functional elements 21 to 24, 26 and 251) are software modules realized by the CPU 204 of the host device 20 executing the particular program and the OS. However, at least one of the functional elements 21 to 26 may be realized by a hardware module. The file system 25 further comprises the file/logical-address management table 252.

The host device 20 also comprises a tier arrangement rule list 27, a file path list 28 and an application 29. The tier arrangement rule list 27, the file path list 28, the application 29 and the file/logical-address management table 252 are stored in the HDD 203 of the host device 20 shown in FIG. 1, and are loaded therefrom into the memory 202 when necessary (when, for example, the host device 20 is activated).

The rule input unit 21 receives a tier arrangement rule (more specifically, tier arrangement rule information describing the tier arrangement rule) from the outside of the host device 20. The tier arrangement rule is a rule for transferring (locating), to a designated tier, an extent including blocks that constitute a designated file. The tier arrangement rule will be described later in detail. The tier arrangement rule received by the rule input unit 21 is held in the tier arrangement rule list 27.

The tier arrangement instructing unit 22 controls the mode switching unit 125 in the storage controller 12, and the file extracting unit 23, the file designating unit 24 and the file arrangement unit 26 in the host device 20, in order to transfer, to the tier designated by the tier arrangement rule in the tier arrangement rule list 27, the extent including blocks that constitute the file designated by the tier arrangement rule. The file extracting unit 23 extracts all file paths indicated by the tier arrangement rule. The extracted file paths are stored in the file path list 28.

The file designating unit 24 requests the file access controller 251 of the file system 25 to access files designated by respective file paths stored in the file path list 28. The file system 25 has a known function of managing correspondence between files stored in the logical disk (in FIG. 2, the logical disk 110) in the tiered block storage device 11, and respective sets of blocks (more specifically, one or more block sequences) constituting the files, and controlling access to the logical disk. In contrast, the tiered storage system 10 (more specifically, the storage controller 12 of the tiered storage system 10) does not consider how the sets of the blocks in the logical disk are associated with the files.

The file access controller 251 of the file system 25 accesses, via the data input/output controller 126 of the storage controller 12, the blocks that constitute the file requested by the file designating unit 24. The file arrangement unit 26 performs rearrangement so that a set of blocks constituting a file designated by each of the file paths held in the file path list 28 will be located sequentially in the logical disk 110. The file arrangement unit 26 is used in a first modification described later.

FIG. 4 shows a data structure example of the file/logical-address management table 252. The file/logical-address management table 252 has entries associated with respective files managed by the file system 25. Each entry of the file/logical-address management table 252 includes a file path field and an LBA field.

The file path field is used to hold the file path of a corresponding file (more specifically, to hold information indicative of the file path). The LBA field is used to hold LBA information associated with a set of blocks constituting the corresponding file. Assume here that all blocks constituting the corresponding file are located sequentially in the logical disk 110 (more specifically, in the virtual storage area of the logical disk 110). In this case, the LBA information includes the respective LBAs of the leading and final blocks in the sequential blocks (i.e., a sequence of blocks of sequential LBAs). In other words, the LBA information is indicative of the LBA range of the sequential blocks. The LBA range may be indicated by the LBA of the leading block included in the sequential blocks, and the number of the blocks (or the entire size of the sequential blocks). The corresponding file may be formed of a single block. In this case, the LBA of the leading block is identical to that of the final block.

Assume here that the corresponding file is fragmented, and the blocks thereof are fragmented into segments in the tiered storage system 10. Each of the segments comprises blockes (a sequence of blocks) sequentially located in the logical disk 110. In this case, LBA information includes, for each of the segments, the respective LBAs of the leading and final blocks of a corresponding segment. Namely, the LBA information is indicative, for each of the segments, of the LBA range of the corresponding segment. Further, at least one of the segments may be formed of one block.

In the description below, even when all blocks constituting a file are located sequentially in the logical disk 110, the set of these blocks is called a segment for convenience. Namely, in the description below, each file is formed of one or more segments.

FIG. 5 shows a data structure example of the tier arrangement rule list 27. Each element (i.e., each tier arrangement rule) of the tier arrangement rule list 27 includes a rule ID, tier information, a rule type, rule content, start time information, and finish time information. The rule ID is indicative of an ID unique to a corresponding tier arrangement rule. The tier information is indicative of a tier in which data is to be located. The rule type is indicative of the type of the corresponding tier arrangement rule, i.e., is indicative of, for example, whether the rule is associated with file designation (first type) or application cooperation (second type). The file designation is indicative of that a file is designated as data to be located in a tier (designated tier) indicated by the tier information. The application cooperation is indicative of that the data to be located in a designated tier is blocks accessed by a particular application activated by a predetermined program (hereinafter, referred to as a cooperation program). In the description below, a tier arrangement rule whose rule type is the file designation will be referred to as a file designation arrangement rule, and a tier arrangement rule whose rule type is the application cooperation will be referred to as an application cooperation arrangement rule.

The rule content depends upon the rule type. If the rule type is the file designation, a file path is written as the rule content (first rule content). The file path can be designated by means of a normal expression or a wild card that uses a special sign, such as *. Namely, the file designation arrangement rule is a rule for transferring (positioning), to a designated tier, an extent including blocks (a set of blocks) constituting a file designated by the rule content. In contrast, if the rule type is the application cooperation, program information for designating a cooperation program is written as the rule content (second rule content). Namely, the application cooperation arrangement rule is a rule for transferring, to a designated tier, an extent including blocks accessed by a particular application (application 29 in the embodiment) that has been activated by the cooperation program designated by the rule content. As the second rule content, information for designating a program, such as a batch file (batch program) or a script, may be written.

The start time information is indicative of a time point at which tier arrangement processing, to which a corresponding tier arrangement rule is applied, is started. The finish time information is indicative of a time point at which the corresponding tier arrangement processing is finished. The start time information may indicate a time and date when the corresponding tier arrangement processing is started. Similarly, the finish time information may be indicative of a time and date when the corresponding tier arrangement processing is finished.

FIG. 6 shows a data structure example of a file path list 28. The file path list 28 is used to hold file paths extracted by the file extracting unit 23. Each element of the file path list 28 includes a file path ID and a file path (file path information). The file path ID is the ID of a corresponding file path.

(1) Registration of a tier arrangement rule and (2) tier arrangement processing, implemented in the embodiment, will be described in this order.

(1) Registration of Tier Arrangement Rule

Firstly, the registration of a tier arrangement rule will be described. Assume here that the host device 20 has been requested from the outside to register a tier arrangement rule. Also assume that registration of the tier arrangement rule has been requested by a user operation. In this case, the rule input unit 21 of the host device 20 receives, from the outside of the host device 20, a tier arrangement rule designated by the user operation, and adds the received tier arrangement rule to the tier arrangement rule list 27. The user operation is performed using a keyboard connected to the host device 20, or an external device, such as a terminal, connected to the host device 20 via a network.

(2) Tier Arrangement Processing

Figure 7:
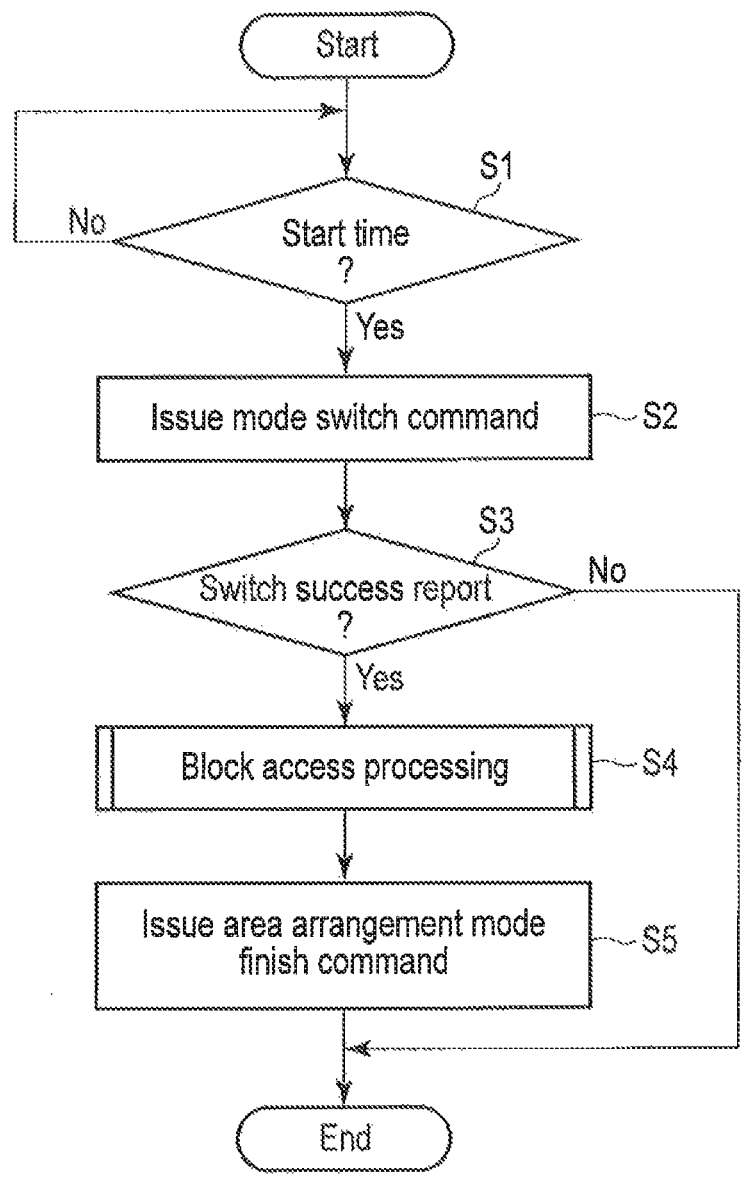
FIG. 7 is a flowchart for explaining an exemplary procedure of a tier arrangement processing executed on a host device side in the embodiment.
Figure 8:
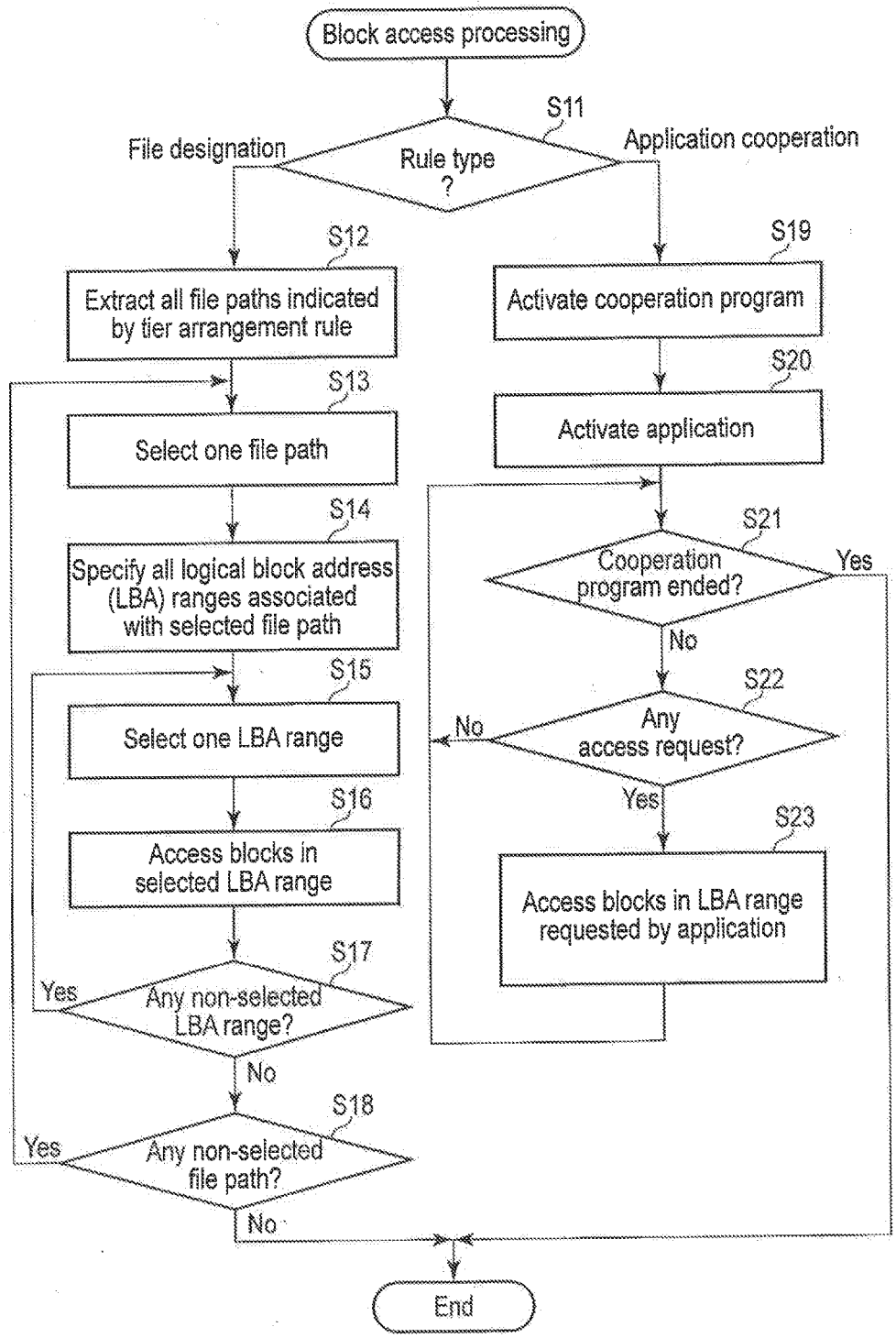
FIG. 8 is a flowchart for explaining an exemplary procedure of a block access processing included in the tier arrangement processing shown in FIG. 7.
Figure 9:
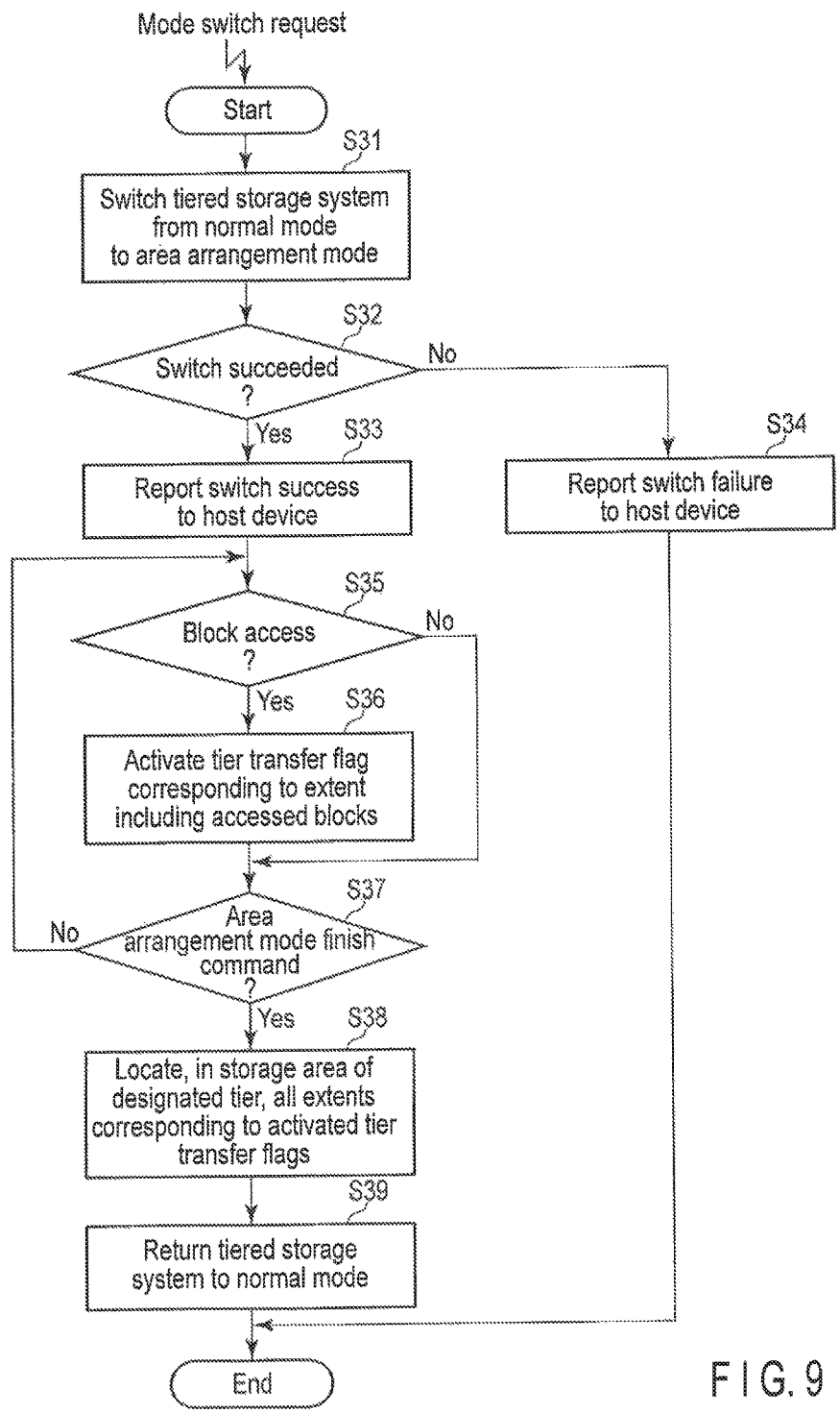
FIG. 9 is a flowchart for explaining an exemplary procedure of a tier arrangement processing executed on the tiered storage system side in the embodiment.

Referring then to FIGS. 7 to 9, the tier arrangement processing will be described. FIG. 7 is a flowchart for explaining an exemplary procedure of a tier arrangement processing (hereinafter referred to as a first tier arrangement processing) executed on the host device 20 side. FIG. 8 is a flowchart for explaining an exemplary procedure of a block access processing included in the first tier arrangement processing shown in FIG. 7. FIG. 9 is a flowchart for explaining an exemplary procedure of a tier arrangement processing (hereinafter referred to as a second tier arrangement processing) executed on the tiered storage system 10 side in accordance with a mode switch command issued in the first tier arrangement processing shown in FIG. 7.

Firstly, the tier arrangement instructing unit 22 monitors the start times of all tier arrangement rules held in the tier arrangement rule list 27, thereby determining that a start time has been reached (step S1). In this example, it is assumed that the start time (0:00) of a tier arrangement rule having a rule ID of 1 has been reached (Yes in step S1). In this case, the tier arrangement instructing unit 22 proceeds to step S2 to start application of the tier arrangement rule having its start time reached.

In step S2, the tier arrangement instructing unit 22 issues, to the storage controller 12 of the tiered storage system 10, a mode switch command for instructing switching of the operation mode of the tiered storage system 10 from the normal mode to the area arrangement mode. In the area arrangement mode, the mode switch command also designates a tier in which all extents corresponding to the activated tier transfer flags are to be located.

The mode switch command issued by the tier arrangement instructing unit 22 is received by the mode switching unit 125 of the storage controller 12. At this time, in the storage controller 12, the second tier arrangement processing shown in the flowchart of FIG. 9 is started as follows: Firstly, the mode switching unit 125 switches the operation mode of the tiered storage system 10 from the normal mode to the area arrangement mode (step S31). Then, the mode switching unit 125 determines whether mode switching has succeeded (step S32). If mode switching has succeeded (Yes in step S32), the mode switching unit 125 informs the host device 20 of success of mode switching in response to the mode switch command (step S33). In contrast, if mode switching has failed (No in step S32), the mode switching unit 125 informs the host device 20 of failure of mode switching (step S34). Thus, the second tier arrangement processing is finished.

The response sent from the mode switching unit 125 to the host device 20 is received by the tier arrangement instructing unit 22. The tier arrangement instructing unit 22, in turn, determines whether the response is indicative of success in mode switching (step S3). If it is indicative of failure in mode switching (No in step S3), the first tier arrangement processing is finished. In contrast, if it is indicative of success in mode switching (Yes in step S3), the block access processing (step S4) is executed as follows in accordance with the flowchart shown in FIG. 8:

Firstly, the tier arrangement instructing unit 22 determines whether the role type of a tier arrangement rule having its start time reached is the file designation or the application cooperation (step S11). A description will now be given of the case 2a) of the file designation and the case 2b) of the application cooperation in the order mentioned.

2a) Block Access Processing Executed in the Case of File Designation

If it is determined in step S11 that the rule type is the file designation, the tier arrangement instructing unit 22 issues a file extraction command to the file extracting unit 23. The file extraction command includes the rule content of a tier arrangement rule having its start time reached, i.e., includes file path information. The file extracting unit 23 receives the file extraction command issued by the tier arrangement instructing unit 22. Then, the file extracting unit 23 extracts, from the file/logical-address management table 252, all file paths indicated by the file path information included in the received file extraction command (i.e., file paths indicated by the tier arrangement rule) (step S12). If the rule ID of the tier arrangement rule is 1, the rule content includes file-path/var/log/*.log. Assume here that a set of file paths including, for example, file-path/var/log/message.log has been extracted. The extracted set of file paths is held in the file path list 28.

As described above, assume that all file paths indicated by the tier arrangement rule have been extracted by the file extracting unit 23 and held in the file path list 28 (step S12). In this case, the tier arrangement instructing unit 22 issues, to the file instructing unit 24, an access command for instructing access to the set of files indicated by the extracted file paths.

Then, the file instructing unit 24 selects one non-selected file path from the file path list 28 (step S13). After that, the file instructing unit 24 inquires of the file access controller 251 LBA (logical block address) ranges associated with the selected file path.

In response to this inquiry, the file access controller 251 refers to the file/logical-address management table 252, and thus specifies all LBA ranges associated with the selected file path (step S14). The file access controller 251 informs the file instructing unit 24 of all the specified LBA ranges.

The file instructing unit 24, in turn, selects one of the informed LBA ranges (step S15). After that, the file instructing unit 24 requests the file access controller 251 to access blocks (a sequence of blocks) within the selected LBA range.

In response to this request, the file access controller 251 accesses blocks (more specifically, a sequence of blocks having serial LBAs, i.e., a segment) that exist in the logical disk 110 of the tiered storage system 10 and in the selected LBA range via the data input/output controller unit 126 of the storage controller 12 (step S16). In the embodiment, this access is a read access, and data is read from the blocks within the selected LBA range.

After completing the access to the blocks within the selected LBA range (step S16), the file instructing unit 24 determines whether the specified LBA ranges include a non-selected LBA range (step S17). If a non-selected LBA range is included (Yes in step S17), the file instructing unit 24 returns to step S15, and selects the non-selected LBA range. The file access controller 251 accesses blocks in the LBA range, selected by the file instructing unit 24, via the data input/output controller unit 126 (step S16).

At this time, the tiered storage system 10 is set in the area arrangement mode by the mode switching unit 125 (steps S31 to S33). If the mode switching unit 125 has informed the host device 20 of success in mode switching (step S33), the data input/output controller unit 126 monitors access (i.e., access to blocks) by the file access controller 251 of the host device 20 for a time period not longer than, for example, a first time period (step S35). In the area arrangement mode, if the file access controller 251 has accessed blocks before the first time period elapses (Yes in step S35), the data input/output controller unit 126 requests the data arrangement controller 127 to activate a tier transfer flag corresponding to an extent including the accessed blocks in the LBA range.

In response to the request, the data arrangement controller 127 executes the first operation. Namely, the data arrangement controller 127 refers to the extent management table 128, thereby specifying the extent including the accessed blocks in the LBA, and activating the tier transfer flag associated with the specified extent (step S36). After that, the data arrangement controller 127 passes control to the mode switching unit 125. The mode switching unit 125, in turn, determines whether it has received a command to finish the area arrangement mode (step S37). If the mode switching unit 125 does not receive this command (No in step S37), it passes control to the data input/output controller 126.

The data input/output controller 126, in turn, waits for subsequent block access for a time period not longer than the first time period (step S35). If the file access controller 251 has accessed blocks before the first time period elapses (Yes in step S35), the data input/output controller unit 126 requests the data arrangement controller 127 to activate the tier transfer flag, as described above.

Assume here that the file access controller 251 has accessed the blocks of all specified LBA ranges. In this case, since no non-selected LBA range exits (No in step S17), the file designating unit 24 determines that access to the file designated by the selected file path has been completed. Subsequently, the file designating unit 24 determines whether the file path list 28 contains another non-selected file path (step S18).

If there is a non-selected file path (Yes in step S18), the file designating unit 24 returns to step S13, and selects the non-selected file path. After that, the file instructing unit 24 inquires of the file access controller 251 LBA (logical block address) ranges associated with the selected file path. Then, the file access controller 251 specifies all LBA ranges associated with the selected file path (step S14). Steps S15 to S17 are executed on all specified LBA ranges. Namely, the file designated by the selected file path is accessed.

Assume that access to the files designated by all file paths in the file path list 28 has been completed, whereby the file path list 28 does not contain a non-selected file path (No in step S18). At the time, the block access processing (step S4) is finished.

Then, the tier arrangement instructing unit 22 issues, to the storage controller 12, an area arrangement mode finish command to finish the area arrangement mode (step S5). Thus, the first tier arrangement processing in the host device 20 is finished. The area arrangement mode finish command issued by the tier arrangement instructing unit 22 is received by the mode switching unit 125 of the storage controller 12.

In the storage controller 12, if subsequent block access is not executed until the above-mentioned first time period elapses (No in step S35), control is passed to the mode switching unit 125. Also when tier transfer flags are activated (step S36), control is passed to the mode switching unit 125 as described above. In this case, the mode switching unit 125 determines whether it has received the area arrangement mode finish command (step S37).

If the mode switching unit 125 has received the area arrangement mode finish command (Yes in step S37), it passes control to the data arrangement controller 127. The data arrangement controller 12, in turn, executes a second operation. Namely, the data arrangement controller 127 refers to the extent management table 128, thereby specifying all extents corresponding to the currently activated tier transfer flags, and locating (transferring) the specified extents (more specifically, data in the specified extents) in (to) the storage area of a physical storage of a designated tier (step S38).

In step S38, whenever, for example, an extent is located in a physical storage of a designated tier, the data arrangement controller 127 updates the content of the physical storage ID field and physical storage address field of an entry of the extent management table 128 corresponding to the extent. Assume here that the physical storage of the designated tier is the high-speed storage device 111, and that a first extent is located in a first physical storage address range of the high-speed storage device 111. In this case, the data arrangement controller 127 updates the content of the physical storage ID field and physical storage address field of an entry of the extent management table 128 corresponding to the first extent, to the ID of the high-speed storage device 111 and the first physical storage address range, respectively. Further, the data arrangement controller 127 turns off a tier transfer flag in the above-mentioned corresponding entry.

The data arrangement controller 127 selects a location destination of the first extent from a set of free extents in the high-speed storage device 111 (i.e., a physical storage of the designated tier). If the high-speed storage device 111 does not contain a free extent that can be used for the location of the first extent, the data arrangement controller 127 selects, from the high-speed storage device 111, a second extent whose data is to be transferred from (forced out of) the high-speed storage device 111 to the low-speed storage device 112, before locating the first extent in the high-speed storage device. By transferring the data of the second extent to the low-speed storage device 112, the data arrangement controller 127 secures a free extent usable for the location of the first extent. The second extent is a least-access-frequency extent among all extents located in the high-speed storage device 111.

In contrast, if no non-selected LBA range is included in the specified LBA ranges (No in step S17), the file designating unit 24 proceeds to step S18. If the file path selected in step S13 is, for example, /var/log/message.log, it is evident from the file/logical-address management table 252 of FIG. 4 that only one LBA range 000-015 is specified. In this case, if blocks in the LBA range 000-015 have been accessed (step S16), no other non-selected LBA range exists (No in step S17), and hence the file designating unit 24 proceeds to step S18.

After all specified extents are located in the physical storage of the designated tier (step S38), this fact is reported to the mode switching unit 125. The mode switching unit 125, in turn, finishes the area arrangement mode, and returns the operation mode of the tiered storage system 10 into the normal mode (step S39). Thus, the second tier arrangement processing in the tiered storage system 10 (storage controller 12) is finished.

2b) Block Access Processing Executed in the Case of Application Cooperation

A description will now be given of a block access processing executed when it is determined in step S11 that the rule type of a tier arrangement rule whose start time is reached is the application cooperation. In this case, the tier arrangement instructing unit 22 starts a cooperation program indicative of the rule content of the tier arrangement rule whose start time is reached (step S19). Namely, the tier arrangement instructing unit 22 executes the cooperation program. The cooperation program starts, for example, the application 29 as a particular application predetermined to cooperate with the cooperation program (step S20).

When the application 29 has been started by the cooperation program (step S20), the tier arrangement instructing unit 22 waits for the termination of the cooperation program (step S21). When the application 29 is operating, it requests a block access (read or write access) to the tiered storage system 10 (more specifically, the logical disk 110 in the tiered storage system 10). Whenever the application 29 has requested a block access (Yes in step S22), the file access controller 251 accesses blocks (a sequence of blocks) within a requested LBA range via the data input/output controller 126 of the storage device 12 (step S23).

At this time, the tiered storage system 10 is set in the area arrangement mode (steps S31 to S33). If the file access controller 251 has executed a block access in the area arrangement mode (Yes in step S35), the data arrangement controller 127 specifies an extent including the blocks in the LBA range accessed, and activates the tier transfer flag associated with the specified extent, as described above (step S36).

Assume here that the application 29 is before long terminated by the cooperation program, and then the execution of the cooperation program is finished (Yes in step S21). In this case, the block access processing (step S4) finishes. The operations after the block access are similar to those performed when the rule type is the file designation. Namely, the tier arrangement instructing unit 22 issues the area arrangement mode finish command to the storage controller 12 (step S5). In this case (Yes in step S37), the data arrangement controller 127 of the storage controller 12 specifies all extents corresponding to the currently activated tier transfer flags, and locates all specified extents in the storage area of the physical storage of the designated tier (step S38).

If the finish time of the currently applied tier arrangement rule has been reached during the block access processing (step S4), the tier arrangement instructing unit 22 finishes the block access processing (step S4). More specifically, when the currently executed block access has finished, the tier arrangement instructing unit 22 finishes the block access processing (step S4). After that, the tier arrangement instructing unit 22 issues the area arrangement mode finish command to the storage controller 12 (step S5).

As described above, in the embodiment, the host device 20 causes the mode switching unit 125 to set the tiered storage system 10 in the area arrangement mode in order to locate a designated file in the storage area of the designated tier in the tiered storage system 10 (step S2). In this state, the host device 20 specifies blocks constituting the designated file, based on the file system 25, as in normal file access (steps S13 and S14). Subsequently, the host device 20 accesses the specified blocks without recognizing the correspondence relationship, necessary for the location of the designated file, between the specified blocks and extents in the tiered storage system 10 (steps S15 and S16).

In contrast, the storage controller 12 of the tiered storage system 10 manages the correspondence relationship between blocks and extents, using the extent management table 128. Further, the storage controller 12 specifies extents, including the accessed blocks, in accordance with block access by the host device 20 in the area arrangement mode, and activates tier transfer flags associated with the specified extents (i.e., makes the flags in a tier transfer instructing state) (steps S35 and S36).

The above-described designated file (more specifically, the designated file path) is written in the tier arrangement rule. The host device 20 specifies the designated file based on a tier arrangement rule whose start time has been reached, and accesses blocks constituting the designated file. The file written in the tier arrangement rule may be a file scheduled to be used by the host device 20 when the start time indicated by the tier arrangement rule has been reached. In this case, the file written in the tier arrangement rule can be used by the host device 20 and also can be located in the storage area of the designated tier in the tiered block storage device 11. Furthermore, block access based on the tier arrangement rule may be a type of dummy access (when the rule type of the tier arrangement rule is the file designation). More specifically, block access based on the tier arrangement rule may be used as a trigger for designating extents including accessed blocks (i.e., extents to be located in the designated tier), and activating the tier transfer flags associated with the extents.

In this case, the data of the accessed blocks may be discarded without being used by the host device 20.

After accessing the blocks that constitute all designated files, the host device 20 issues the area arrangement mode finish command to the storage controller 12. Upon receiving the command, the storage controller 12 locates all the extents, associated with the activated tier transfer flags, in the storage area of the designated tier in the tiered block storage device 11 (steps S37 and S38). Thus, in the embodiment, the storage controller 12 can locate, in a storage area of a designated tier, a file (designated file) to be located in the designated tier, without using a special file system. The host device 20 does not have to consider the correspondence relationship between blocks and extents, and the storage controller 12 does not have to access the file system 25 in the host device 20.

Further, in the embodiment, if the rule type of the tier arrangement rule is the application cooperation, the storage controller 12 activates tier transfer flags associated with extents including accessed blocks, in accordance with the access to the blocks requested by the application 29 started by the cooperation program (steps S35 and S36). Thus, in the embodiment, the extents including the requested blocks can be located in the storage area of the designated tier in accordance with a block access request from the application 29.

In the embodiment, assume that the tiered storage system 10 is in the area arrangement mode, and a normal application operating in the host device 20 has requested the file access controller 251 to perform block access. In response to this request, the file access controller 251 accesses requested blocks via the data input/output controller 126. At this time, tier transfer flags corresponding to extents including the accessed blocks are activated. Namely, the extents including the blocks accessed by the normal application are also located in a storage area of a tier designated by a tier arrangement rule currently applied in the area arrangement mode. In view of this, an access request from the normal application may be kept invalid in the area arrangement mode.

<First Modification>

A first modification of the embodiment will be described. Firstly, in the embodiment, assume that a designated file has a small size, and blocks constituting the designated file occupy only part of each extent constituting the file. In this case, most blocks in the extents located in (i.e., transferred to) a storage area of a designated tier are irrelevant to the designated file. Namely, in the embodiment, data in the blocks irrelevant to the designated file is also transferred to the storage area of the designated tier. Accordingly, if the designated tier is the upper tier, the use efficiency of the storage area of the upper tier (high-speed storage device 111) is reduced.

In the first modification, to prevent reduction of the use efficiency of the storage area of the upper tier, the blocks (a set of blocks) constituting the designated file is subjected to processing (hereinafter referred to as file arrangement processing) for pre-locating them in a single extent. FIG. 10 is a view for explaining the outline of the file arrangement processing. In FIG. 10, blocks Ba, Bb, Bc, Bd, Be, Bf, Bg and Bh constitute a designated file. In the example of FIG. 10, blocks Ba and Bb are contained in an extent EXTa1, and blocks Bc and Bd are contained in an extent EXTa2. Similarly, block Be is contained in an extent EXTa3, and blocks Bf and Bg are contained in an extent EXTa4. Further, block Bh is contained in an extent EXTa5. In FIG. 10, it is assumed for facilitating the drawing that one extent is formed of 8 blocks (i.e., N=8).

In the embodiment, the extents EXTa1 to EXTa5 are located in a storage area of a designated tier. In contrast, in the first modification, the blocks Ba, Bb, Bc, Bd, Be, Bf, Bg and Bh are located in an extent EXTb as shown in FIG. 10. Then, the extent EXTb is located in the storage area of the designated tier. Accordingly, in the example of FIG. 10, the number of extents located in the storage area of the designated tier is reduced from 5 to 1, compared to the embodiment.

The above file arrangement processing is executed, for example, between steps S12 and S13 of the flowchart shown in FIG. 8. Referring then to FIG. 11, a procedure of this file arrangement processing will be described. FIG. 11 is a flowchart for explaining an exemplary procedure of the file arrangement processing executed on the host device 20 side.

Assume here that the file extracting unit 23 has extracted, from the file/logical-address management table 252, all file paths indicated by a tier arrangement rule (step S12). In this case, the tier arrangement instructing unit 22 issues a file arrangement command to the file arrangement unit 26 before issuing, to the file designating unit 24, an access command to instruct access to a set of files indicated by the extracted file paths. The file arrangement command instructs the arrangement unit 26 to locate the blocks constituting a file in a single extent as far as possible.

In response to the file arrangement command from the tier arrangement instructing unit 22, the file arrangement unit 26 executes the file arrangement processing as follows: Firstly, the file arrangement unit 26 selects one non-selected file path from the file path list 28 (step S41). After that, the file arrangement unit 26 replicates blocks (a set of blocks) constituting a file (i.e., a designated file) indicated by the selected file path, in an area of the logical disk 110 having sequential LBAs via the data input/output controller 126 of the storage controller 12 (step S42).

Step S42 will be described in detail. Firstly, the file arrangement unit 26 requests the data input/output controller 126 of the storage controller 12 via the file access controller 251 of the file system 25 to replicate the blocks constituting the designated file in the area of the logical disk 110 having sequential LBAs. Then, the data input/output controller 126 replicates the requested blocks in a free extent in the logical disk 110. In the initial step S42, an area used for the replication starts from a leading portion of a free extent. By this replication, it becomes strongly possible that the blocks (the set of blocks) constituting the designated file will be located in the same extent.

There are well known conventional methods of managing which one(s) of the extents indicated by the extent management table 128 is (are) a free extent. These methods include a method of using a free extent list that holds a set of IDs assigned to free extents. Further, each entry of the extent management table 128 may include a flag field indicative of whether it is a free entry.

After replicating the requested blocks in a free extent in the logical disk 110, the data input/output controller 126 informs the file arrangement unit 26 of the LBA range of the area in which the blocks are replicated. Then, the file arrangement unit 26 uses a tentative file path as a file path for a replication destination, and adds an entry including the combination of the file path for the replication destination and the informed LBA range to the file/logical-address management table 252 via the file access controller 251.

Thereafter, the file arrangement unit 26 renames (overwrites) the (tentative) file path for the replication destination with the same file path name (file name) as the replication source, via the file access controller 251 (step S43). For this renaming, the file arrangement unit 26 deletes an entry including the file path of the replication source from the file/logical-address management table 252 via the file access controller 251. The file arrangement unit 26 iterates the above operations (steps S41 to S43) until no non-selected file paths are detected in the file path list 28 (step S44).

Assume here that a set of files indicated by the file paths in the file path list 28 includes first and second files. Assume also that first blocks (a first set of blocks) constituting the first file have been replicated in the initial step S42 in a first area starting from the leading portion of the first extent. Assume further that in this state, the first extent has a free portion, and the remaining area of the first extent including the free portion is greater than the total size of second blocks (a second set of blocks) constituting the second file. In this case, in step S42 of the second loop, it would be better that the second set of blocks is replicated in a second area of the first extent subsequent to the first area of the same. In contrast, if the remaining area of the first extent is smaller than the total size of the second set of blocks, a certain number of blocks included in the second set of blocks may be replicated in the remaining area of the first extent, and the remaining portion, for example, of the second set of blocks be replicated in an area starting from the leading portion of a second extent different from the first extent.

After iterating steps S41 to S43 until no non-selected file paths are detected in the file path list 28 (No in step S44), the file arrangement unit 26 informs the tier arrangement instructing unit 22 of the completion of the file arrangement processing. Then, the tier arrangement instructing unit 22 issues, to the file instructing unit 24, an access command for instructing access to the set of files indicated by the extracted file paths, as in the embodiment where the file paths indicated by a tier arrangement rule have been extracted (step S12). As a result, processing starting from step S13 is executed as in the embodiment.

In the first modification, a set of blocks included in a file to be located in a storage area of a designated tier is located in a single extent as far as possible. As a result, when the designated tier is the upper tier, a possibility that blocks that are not included in the designated file be slip into an extent in the upper tier (i.e., the high-speed storage device 111) becomes weaker. Thus, in the first modification, the use efficiency of the storage area of the high-speed storage device 111 can be enhanced.

<Second Modification>

A second modification of the embodiment will be described. Firstly, in the embodiment, assume that the designated file has a great size. In this case, a lot of time is required to read data from all blocks that constitute the designated file, which reduces the throughput of the tiered storage system 10. If block access based on a tier arrangement rule is dummy access (in the case where the type of the tier arrangement rule is the file designation), it is not always necessary to read all blocks that constitute the designated file.

In view of this, in the second modification, processing (hereinafter referred to as partial read processing) of reading only a certain number of blocks included in the blocks (a set of blocks) constituting a designated file is employed. Namely, in the second modification, the partial read processing is used for block access based on a tier arrangement rule. The partial read processing is a dummy access processing, and is used as a trigger for activating tier transfer flags associated with extents including accessed blocks.

Assume here that the designated file comprises a plurality of segments that overlap with a plurality of extents. In the partial read processing, one block is selected from each of the extents overlapping with a segment. This processing is performed for each of the segments. Whenever one block is selected, it is read (i.e., data in the block is read). In the second modification, for promoting the efficiency of selection, a respective segment is divided into small segments from the leading portion of the respective segment, to have a size of N (N is the number of blocks constituting an extent in this modification) equal to the size of an extent. In this case, the size (the number of blocks) of the final small segment is not more than N. From the respective small segments, leading blocks are selected. Further, in the case of the final small segment including the final block of a corresponding segment, the final block in the final small segment is also selected. If the size (the number of blocks) of a segment is not more than N, it is sufficient if the leading and final blocks of the segment are selected.

FIG. 12 is a view for explaining the outline of the partial read processing according to the second modification. In FIG. 12, the extents EXTc1 to EXTc8 are supposed to be sequential in the logical disk 110. Further, segments SEGa and SEGb are supposed to constitute the designated file. The segment SEGa comprises blocks Ba1 to Ba23 and overlaps with the extents EXTc1 to EXTc4. Similarly, the segment SEGb comprises blocks Bb1 to Bb13 and overlaps with the extents EXTc5 and EXTc6. In FIG. 12, for facilitating the drawing, one extent is supposed to be formed of 8 blocks (N=8).

In the example of FIG. 12, the leading (1st) block Ba1, the 9th block Ba9, the 17th block Ba17 and the final (23th) block Ba23 in the segment SEGa are selected as to-be-read blocks. Similarly, the leading (1st) block Bb1, the 9th block Bb9 and the final (13th) block Bb13 in the segment SEGb are selected as to-be-read blocks. In FIG. 12, the blocks selected from the segments SEGa and SEGb are marked as black square elements, while the blocks not selected therefrom are marked as white square elements.

In the embodiment, 36 blocks (i.e., the blocks Ba1 to Ba23 and Bb1 to Bb13), in total, that constitute the segments SEGa and SEGb are read. In contrast, in the second modification, only 7 blocks (i.e., the blocks Ba1, Ba9, Ba17, Ba23, Bb1, Bb9 and Bb13) selected from the segments SEGa and SEGb are read.

In accordance with the reading of the blocks Ba1, Ba9, Ba17, Ba23 and Bb1, tier transfer flags associated with the extents EXTc1, EXTc2, EXTc3, EXTc4 and EXTc5 are activated. Further, in accordance with the reading of the blocks Bb9 and Bb13, a tier transfer flag associated with the extent EXTc6 is activated. Thereafter, the extents EXTc1 to EXTc6 are located in the designated tier.

As described above, in the second modification, simply by reading a certain number of blocks included in the blocks constituting a file, tier transfer flags associated with all extents including the data of the file can be activated, thereby locating all the extents in a designated tier. Namely, in the second modification, all extents including the data of the file can be accessed by minimal block reading.

The above-described partial read processing is executed in place of, for example, steps S13 to S18 shown in the flowchart of FIG. 8. Referring to FIG. 13, the procedure of the partial read processing will be described. FIG. 13 is a flowchart for explaining an exemplary procedure of the partial read processing executed on the host device 20 side.

Assume here that all file paths indicated by a tier arrangement rule have been extracted from the file/logical-address management table 252 (step S12). In this case, the tier arrangement instructing unit 22 issues, to the file designating unit 24, an access command to instruct the same to access a set of files indicated by the extracted file paths.

Upon receiving the command, the file designating unit 24 selects one non-selected file path from the file path list 28 (step S51). The file designating unit 24 inquires of the file access controller 251 LBA (logical block address) ranges associated with the selected file path.

In response to this inquiry, the file access controller 251 specifies all LBA ranges associated with the selected file path (step S52). The file access controller 251 reports all specified LBA ranges to the file designating unit 24. The file designating unit 24 selects one of the reported LBA ranges (step S53). These steps S51 to S53 are similar to steps S13 to S15 shown in FIG. 8.

Subsequently, the file designating unit 24 sets a pointer P to an initial value of 1 (step S54). The pointer P is indicative of the relative position of a to-be-accessed block in the selected LBA range (i.e., segment). If the pointer P is 1, it is indicative of the leading (first) block in the selected LBA range. In step S54, the file designating unit 24 also sets, as parameters N and M, the size of each extent (more specifically, the number of blocks constituting each extent) and the size of the selected LBA range (more specifically, the number of blocks in the selected LBA range). In the SEGa example of FIG. 12, N=8 and M=23.

After that, the file designating unit 24 calculates the LBA of a P-th block (hereinafter, LBA_P) based on the LBA of the leading block in the selected LBA range (hereinafter, LBA_1) and the pointer P, using the following equation:

$$LBA\_P = LBA\_1 + (P-1)$$

After that, the file designating unit 24 requests the file access controller 251 to access the P-th block in the selected LBA range. Namely, the file designating unit 24 requests the file access controller 251 to access the block whose LBA is LBA_P. Upon receiving the request, the file access controller 251 accesses the P-th block in the selected LBA range of the logical disk 110 via the data input/output controller 126 (step S55). Namely, the file access controller 251 accesses the block of LBA_P on the logical disk 110 via the data input/output controller 126 of the storage controller 12. In accordance with the block access (Yes in step S35), the data arrangement controller 127 of the storage controller 12 activates the tier transfer flag corresponding to an extent including the accessed block (step S36).

After the access (step S55) to the P-th block in the selected LBA range is completed, the file designating unit 24 increments the pointer P by N (step S56). The incremented pointer P is indicative of a block of an LBA that is located N blocks ahead, in an LBA increasing direction, of the block indicated by the pointer P before increment. For instance, if the pointer P before increment is indicative of the block Ba1 shown in FIG. 12, the incremented pointer P is indicative of the block Ba9. Subsequently, the file designating unit 24 determines whether the value of the incremented pointer P is not less than M (step S57).

If the value of the incremented pointer P is less than M (No in step S57), the file designating unit 24 determines that the pointer P does not reach the final block in the selected LBA range. In this case, the file designating unit 24 requests the file access controller 251 to access a block indicated by the incremented pointer P. The file access controller 251, in turn, accesses the P-th block in the selected LBA range of the logical disk 110 via the data input/output controller 126 (step S55).

In contrast, if the value of the incremented pointer P is not less than M (Yes in step S57), the file designating unit 24 determines that the pointer P has reached or passed the final block in the selected LBA range. In this case, the file designating unit 24 requests the file access controller 251 to access the final block in the selected LBA range. The file access controller 251 accesses the final block in the selected LBA range of the logical disk 110 via the data input/output controller 126 (step S58).

For instance, if the pointer P before increment is indicative of the block Ba17 (P=17) shown in FIG. 12, the value (P=25) of the incremented pointer P exceeds M=23 (Yes in step S57). In this case, the final block Ba23 in the segment SEGa is accessed (step S58). Further, a tier transfer flag corresponding to the extent EXTc4 including the block Ba23 is activated (step S36).

When the access to the final block in the selected LBA range (step S58) has been completed, the file designating unit 24 determines whether the specified LBA ranges include a non-selected LBA range (step S59). If a non-selected LBA range is included (Yes in step S59), the file designating unit 24 returns to step S53, and selects the non-selected LBA range. In contrast, if no non-selected LBA range is included (No in step S59), the file designating unit 24 determines whether the file path list 28 contains a non-selected file path (step S60).

If there is a non-selected file path (Yes in step S60), the file designating unit 24 returns to step S51, while if there is no non-selected file path (No in step S60), the block access processing (step S4) is finished.

As described above, in the second modification, only a certain number of blocks included in the blocks constituting the designated file are read, and tier transfer flags corresponding to extents including the read blocks are activated. Namely, in the second modification, the time required for block access for designating extents to be located in a designated tier can be shortened, and reduction in the throughput of the tiered storage system 10 due to the block access can be prevented.

In the above-described at least one embodiment, a designated file can be located in a designated tier without providing any file system on the tiered block storage device side.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A computer system comprising:
   a tiered block storage system comprising a tiered block storage device and a storage controller; and
   a host device configured to access the tiered block storage system,
   wherein:
   the tiered block storage device comprises plural types of storage devices of different access response performances, the storage devices being allocated to respective tiers corresponding to the access response performances of the storage devices, at least a part of each storage area of at least two of the storage devices being allocated to a logical disk comprising a plurality of blocks of a first size, the logical disk being used to store files used by the host device;

the storage controller comprises a mode switching unit, a data input/output controller and a data arrangement controller; and the host device comprises a file system, a rule input unit, a tier arrangement instructing unit and a file designating unit, wherein:

the mode switching unit is configured to switch an operation mode of the tiered block storage system from a first mode to a second mode in accordance with a request from the host device;

the data input/output controller is configured to access the logical disk in accordance with an access request from the host device;

the file system is configured to manage, for respective files stored in the logical disk, correspondence between file paths indicative of the respective files and logical address ranges storing the respective files, and to access, via the data input/output controller, a sequence of blocks constituting a file and stored in one of the logical address ranges when the file designating unit requests the file system to access the one logical address range;

the rule input unit is configured to receive, in accordance with an external request, a tier arrangement rule including file path information used to designate a file, and tier information used to designate a tier in which the file is to be located;

the tier arrangement instructing unit is configured to instruct the storage controller to switch the operation mode to the second mode based on the tier arrangement rule;

the file instructing unit is configured to instruct the file system to access a logical address range which stores a first sequence of blocks constituting a first file indicated by the file path information of the tier arrangement rule; and the data arrangement controller is configured to transfer, to a storage area of a tier designated by the tier arrangement rule, data in an extent including a sequence of blocks located in a logical address range accessed in the second mode, the extent being formed of a second number of blocks having sequential logical addresses.

2. The computer system of claim 1, wherein access to the first file includes a read access.

3. The computer system of claim 2, wherein the file designating unit is further configured to select a certain number of blocks from the first sequence of blocks constituting the first file, and to request the data input/output controller to perform a read access to a logical address range which stores the selected blocks.

4. The computer system of claim 3, wherein the file designating unit is further configured to select, from the first sequence of blocks constituting the first file, a leading block of each of groups and a final block, the groups each being formed of the second number of blocks.

5. The computer system of claim 4, wherein the file designating unit is further configured to select, from each of a plurality of segments, a leading block of each of the groups and a final block when the first file is fragmented into the plurality of segments and each of the plurality of segments is formed of a sequence of blocks having sequential logical addresses.

6. The computer system of claim 2, wherein:

the host device further comprises a file arrangement unit configured to cause the file system to replicate the first sequence of blocks constituting the first file in a storage area of the logical disk having sequential logical addresses; and the file designating unit is further configured to request, after the replication via the file system, the data input/output controller to perform a read access to a logical address range storing the first sequence of blocks included in the replicated first file.

7. The computer system of claim 1, wherein:

the tier arrangement rule includes a rule type indicative of whether a type of the tier arrangement rule is a first type or a second type;

the tier arrangement rule further includes the file path information when the type of the tier arrangement rule is the first type, and further includes program designation information used to designate a first program for activating a particular application when the type of the tier arrangement rule is the second type;

the tier arrangement instructing unit is further configured to activate the first program designated by the program designation information when the type of the tier arrangement rule is the second type; and the file system is further configured to access a sequence of blocks in a requested logical address range via the data input/output controller when the particular application is activated by the first program and access to the logical disk is requested by the particular application.

8. The computer system of claim 1, wherein:

the storage controller further comprises an extent management table including entries associated with respective extents each formed of the second number of blocks, wherein each of the entries holds extent information, and the extent information includes address information indicative of a logical address range and a physical address range corresponding to a respective extent, tier information used to designate a tier to which the respective extent is to be transferred, and a tier transfer flag indicative of whether the respective extent is to be transferred to the designated tier; and the data arrangement controller is further configured to:

set a tier transfer flag corresponding to one of the extents in a first state indicative of that the one extent is to be transferred to the designated tier, when the data input/output controller accesses, in the second mode, the logical disk in accordance with an access request from the host device, the one extent including a sequence of blocks in the accessed logical address range;

refer to the extent management table when the tier arrangement instructing unit requests switching from the second mode to the first mode; and specify an extent to be transferred to the designated tier and corresponding to an entry including the tier transfer flag set in the first state.

9. The computer system of claim 1, wherein:

the host device further comprises a file extracting unit;

the tier arrangement instructing unit is further configured to request the file extracting unit to extract a file path based on the tier arrangement rule;

the file extracting unit is configured to extract, from the file system, a file path indicated by the file path information in the tier arrangement rule, in accordance with the request to extract the file path; and the first file is indicated by the extracted file path.

10. A storage controller of a tiered storage system comprising a tiered block storage device, the storage controller being configured to process an access request from a host device, the tiered block storage device comprising plural types of storage devices having different access response performances, the plural types of storage devices being allocated to tiers corresponding to the access response performances, at least a certain number of storage areas included in all storage areas of at least two types of storage devices included in the plural types of storage devices being allocated to a logical disk comprising a plurality of blocks of a first size, the logical disk being used to store files used by the host device, the storage controller comprising:

- a mode switching unit configured to switch an operation mode of the tiered block storage system from a first mode to a second mode when the host device requests the storage controller to switch the first mode to the second mode, based on a tier arrangement rule input to the host device in accordance with an external request to the host device, the tier arrangement rule including file path information used to designate a file, and tier information used to designate a tier in which the file is to be located;
- a data input/output controller configured to access a first sequence of blocks constituting a first file indicated by the file path information in the tier arrangement rule, when the host device requests the storage controller to access a logical address range of the logical disk storing the first sequence of blocks; and
- a data arrangement controller configured to transfer, to a storage area of a tier designated by the tier arrangement rule, data in an extent including a sequence of blocks located in a logical address range accessed in the second mode, the extent being formed of a second number of blocks having sequential logical addresses.

11. The storage controller of claim 10, further comprising an extent management table including entries associated with respective extents each formed of the second number of blocks, wherein each of the entries holds extent information, and the extent information includes address information indicative of a logical address range and a physical address range corresponding to a respective extent, tier information used to designate a tier to which the respective extent is to be transferred, and a tier transfer flag indicative of whether the respective extent is to be transferred to the designated tier, wherein the data arrangement controller is further configured to:
- set a tier transfer flag corresponding to one of the extents in a first state indicative of that the one extent is to be transferred to the designated tier, when the data input/output controller accesses, in the second mode, the logical disk in accordance with an access request from the host device, the one extent including a sequence of blocks in the accessed logical address range;
- refer to the extent management table when the host device requests switching from the second mode to the first mode; and
- specify an extent to be transferred to the designated tier and corresponding to an entry including the tier transfer flag set in the first state.

12. A file arrangement method implemented in a storage controller of a tiered storage system comprising a tiered block storage device, the storage controller being configured to process an access request from a host device, the tiered block storage device comprising plural types of storage devices having different access response performances, the plural types of storage devices being allocated to tiers corresponding to the access response performances, at least a certain number of storage areas included in all storage areas of at least two types of storage devices included in the plural types of storage devices being allocated to a logical disk comprising a plurality of blocks of a first size, the logical disk being used to store files used by the host device, the file arrangement method comprising:

- switching an operation mode of the tiered block storage system from a first mode to a second mode when the host device requests the storage controller to switch the first mode to the second mode, based on a tier arrangement rule input to the host device in accordance with an external request to the host device, the tier arrangement rule including file path information for designating a file, and tier information used to designate a tier in which the file is to be located;
- accessing a first sequence of blocks constituting a first file indicated by the file path information in the tier arrangement rule, when the host device requests the storage controller to access a logical address range of the logical disk storing the first sequence of blocks; and
- transferring, to a storage area of a tier designated by the tier arrangement rule, data in an extent including a sequence of blocks located in a logical address range accessed in the second mode, the extent being formed of a second number of blocks having sequential logical addresses.

13. The file arrangement method of claim 12, wherein:
the storage controller comprises an extent management table including entries associated with respective extents each formed of the second number of blocks, wherein each of the entries holds extent information, and the extent information includes address information indicative of a logical address range and a physical address range corresponding to a respective extent, tier information used to designate a tier to which the respective extent is to be transferred, and a tier transfer flag indicative of whether the respective extent is to be transferred to the designated tier; and the file arrangement method further comprises
- setting a tier transfer flag corresponding to one of the extents in a first state indicative of that the one extent is to be transferred to the designated tier, when the logical disk is accessed, in the second mode, in accordance with an access request from the host device, the one extent including a sequence of blocks in the accessed logical address range;
- referring to the extent management table when the host device requests switching from the second mode to the first mode; and
- specifying an extent to be transferred to the designated tier and corresponding to an entry including the tier transfer flag set in the first state.

14. A computer-readable, non-transitory storage medium having stored thereon a storage control program which is executable by a storage controller of a tiered storage system comprising a tiered block storage device, the storage controller being configured to process an access request from a host device, the tiered block storage device comprising plural types of storage devices having different access response performances, the plural types of storage devices being allocated to tiers corresponding to the access response performances, at least a certain number of storage areas included in all storage areas of at least two types of storage devices included in the plural types of storage devices being allocated to a logical disk comprising a plurality of blocks of a first size, the logical disk being used to store files used by the host device, the storage control program controlling the storage controller to execute functions of:

switching an operation mode of the tiered block storage system from a first mode to a second mode when the host device requests the storage controller to switch the first mode to the second mode, based on a tier arrangement rule input to the host device in accordance with an external request to the host device, the tier arrangement rule including file path information for designating a file, and tier information used to designate a tier in which the file is to be located;

accessing a first sequence of blocks constituting a first file indicated by the file path information in the tier arrangement rule, when the host device requests the storage controller to access a logical address range of the logical disk storing the first sequence of blocks; and transferring, to a storage area of a tier designated by the tier arrangement rule, data in an extent including a sequence of blocks located in a logical address range accessed in the second mode, the extent being formed of a second number of blocks having sequential logical addresses.

15. The storage medium of claim 14, wherein:

the storage controller comprises an extent management table including entries associated with respective extents each formed of the second number of blocks, wherein each of the entries holds extent information, and the extent information includes address information indicative of a logical address range and a physical address range corresponding to a respective extent, tier information used to designate a tier to which the respective extent is to be transferred, and a tier transfer flag indicative of whether the respective extent is to be transferred to the designated tier; and the storage control program further controls the storage controller to execute functions of:

setting a tier transfer flag corresponding to one of the extents in a first state indicative of that the one extent is to be transferred to the designated tier, when the logical disk is accessed, in the second mode, in accordance with an access request from the host device, the one extent including a sequence of blocks in the accessed logical address range;

referring to the extent management table when the host device requests switching from the second mode to the first mode; and specifying an extent to be transferred to the designated tier and corresponding to an entry including the tier transfer flag set in the first state.

* * * * *